US009323475B2

(12) United States Patent
Ono

(10) Patent No.: US 9,323,475 B2
(45) Date of Patent: Apr. 26, 2016

(54) CONTROL METHOD AND INFORMATION PROCESSING SYSTEM

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/477,977

(22) Filed: Sep. 5, 2014

(65) Prior Publication Data
US 2015/0120968 A1 Apr. 30, 2015

(30) Foreign Application Priority Data
Oct. 30, 2013 (JP) ................................ 2013-225305

(51) Int. Cl.
*G06F 3/06* (2006.01)

(52) U.S. Cl.
CPC .............. *G06F 3/067* (2013.01); *G06F 3/0625* (2013.01); *G06F 3/0647* (2013.01); *Y02B 60/1246* (2013.01)

(58) Field of Classification Search
CPC ...... G06F 3/067; G06F 3/0625; G06F 3/0647
See application file for complete search history.

(56) References Cited

U.S. PATENT DOCUMENTS

| 5,978,832 A * | 11/1999 | Sirkin ................. G06F 11/3419 713/502 |
| 2003/0140264 A1 | 7/2003 | Kawano et al. |
| 2005/0210195 A1* | 9/2005 | Teicher ............... G06F 13/4027 711/115 |
| 2009/0144568 A1* | 6/2009 | Fung ..................... G06F 1/3203 713/300 |
| 2011/0213902 A1* | 9/2011 | Hidaka .................. H04L 69/32 710/33 |

FOREIGN PATENT DOCUMENTS

| JP | 5-244260 | 9/1993 |
| JP | 6-12263 | 1/1994 |
| JP | 2003-196083 | 7/2003 |
| JP | 2007-328604 | 12/2007 |

* cited by examiner

*Primary Examiner* — Idriss N Alrobaye
*Assistant Examiner* — Ronald Modo
(74) *Attorney, Agent, or Firm* — Staas & Halsey LLP

(57) ABSTRACT

A control method for an information processing system including a first computer, a second computer, and a plurality of storage devices coupled to the first computer and the second computer through a switch, a processing performance of the second computer being higher than a processing performance of the first computer, the control method includes setting, by the switch, the first computer as a target for connection of the plurality of storage devices; transmitting, by the first computer, data to be processed from the first computer to the plurality of storage devices and thereby storing the data in the plurality of storage devices; switching, by the switch, the target from the first computer to the second computer when the storing is completed; and executing, by the second computer, processing of the data stored in the plurality of storage devices.

9 Claims, 14 Drawing Sheets

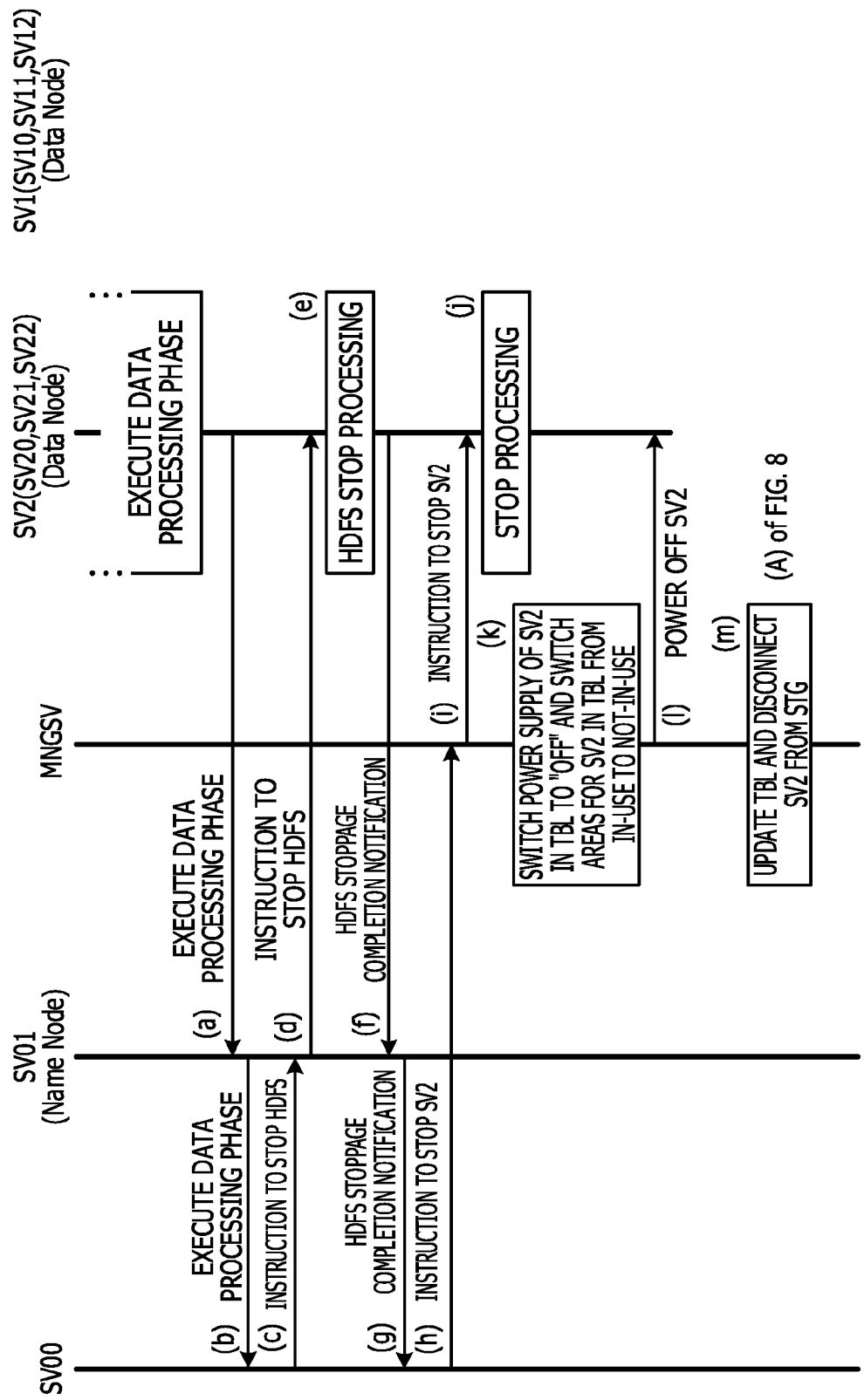

FIG. 8

CONFIGURATION EXAMPLE (A)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | OFF | 0 | 0 | 0 | 0 | 0 | 0 | 0 | 0 | 0 | 0 | 0 | 0 | 0 | 0 |
| SV11 | OFF | 0 | 0 | 0 | 0 | 0 | 0 | 0 | 0 | 0 | 0 | 0 | 0 | 0 | 0 |
| SV12 | OFF | 0 | 0 | 0 | 0 | 0 | 0 | 0 | 0 | 0 | 0 | 0 | 0 | 0 | 0 |
| SV20 | OFF | 0 | 0 | 0 | 0 | 0 | 0 | 0 | 0 | 0 | 0 | 0 | 0 | 0 | 0 |
| SV21 | OFF | 0 | 0 | 0 | 0 | 0 | 0 | 0 | 0 | 0 | 0 | 0 | 0 | 0 | 0 |
| SV22 | OFF | 0 | 0 | 0 | 0 | 0 | 0 | 0 | 0 | 0 | 0 | 0 | 0 | 0 | 0 |

CONFIGURATION EXAMPLE (B)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | OFF | 1 | 0 | 0 | 0 | 0 | 0 | 0 | 0 | 0 | 0 | 0 | 0 | 0 | 0 |
| SV11 | OFF | 1 | 0 | 0 | 0 | 0 | 0 | 0 | 0 | 0 | 0 | 0 | 0 | 0 | 0 |
| SV12 | OFF | 1 | 0 | 0 | 0 | 0 | 0 | 0 | 0 | 0 | 0 | 0 | 0 | 0 | 0 |
| SV20 | OFF | 1 | 0 | 0 | 0 | 0 | 0 | 0 | 0 | 0 | 0 | 0 | 0 | 0 | 0 |
| SV21 | OFF | 1 | 0 | 0 | 0 | 0 | 0 | 0 | 0 | 0 | 0 | 0 | 0 | 0 | 0 |
| SV22 | OFF | 1 | 0 | 0 | 0 | 0 | 0 | 0 | 0 | 0 | 0 | 0 | 0 | 0 | 0 |

FIG. 9

CONFIGURATION EXAMPLE (C)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | OFF | 1 | 0 | 1 | 1 | 1 | 1 | 0 | 0 | 0 | 0 | 0 | 0 | 0 | 0 |
| SV11 | OFF | 1 | 0 | 0 | 0 | 0 | 0 | 0 | 1 | 1 | 1 | 0 | 0 | 0 | 0 |
| SV12 | OFF | 1 | 0 | 0 | 0 | 0 | 0 | 1 | 0 | 0 | 0 | 1 | 1 | 1 | 1 |
| SV20 | OFF | 1 | 0 | 0 | 0 | 0 | 0 | 0 | 0 | 0 | 0 | 0 | 0 | 0 | 0 |
| SV21 | OFF | 1 | 0 | 0 | 0 | 0 | 0 | 0 | 0 | 0 | 0 | 0 | 0 | 0 | 0 |
| SV22 | OFF | 1 | 0 | 0 | 0 | 0 | 0 | 0 | 0 | 0 | 0 | 0 | 0 | 0 | 0 |

⇩

CONFIGURATION EXAMPLE (D)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | ON | 1 | 0 | 1 | 1 | 1 | 1 | 0 | 0 | 0 | 0 | 0 | 0 | 0 | 0 |
| SV11 | ON | 1 | 0 | 0 | 0 | 0 | 0 | 1 | 1 | 1 | 1 | 0 | 0 | 0 | 0 |
| SV12 | ON | 1 | 0 | 0 | 0 | 0 | 0 | 0 | 0 | 0 | 0 | 1 | 1 | 1 | 1 |
| SV20 | OFF | 1 | 0 | 0 | 0 | 0 | 0 | 0 | 0 | 0 | 0 | 0 | 0 | 0 | 0 |
| SV21 | OFF | 1 | 0 | 0 | 0 | 0 | 0 | 0 | 0 | 0 | 0 | 0 | 0 | 0 | 0 |
| SV22 | OFF | 1 | 0 | 0 | 0 | 0 | 0 | 0 | 0 | 0 | 0 | 0 | 0 | 0 | 0 |

CONFIGURATION EXAMPLE (E)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | ON | 0 | 1 | 1 | 1 | 1 | 1 | 0 | 0 | 0 | 0 | 0 | 0 | 0 | 0 |
| SV11 | ON | 0 | 1 | 0 | 0 | 0 | 0 | 1 | 1 | 1 | 1 | 0 | 0 | 0 | 0 |
| SV12 | ON | 0 | 1 | 0 | 0 | 0 | 0 | 0 | 0 | 0 | 0 | 1 | 1 | 1 | 1 |
| SV20 | OFF | 1 | 0 | 0 | 0 | 0 | 0 | 0 | 0 | 0 | 0 | 0 | 0 | 0 | 0 |
| SV21 | OFF | 1 | 0 | 0 | 0 | 0 | 0 | 0 | 0 | 0 | 0 | 0 | 0 | 0 | 0 |
| SV22 | OFF | 1 | 0 | 0 | 0 | 0 | 0 | 0 | 0 | 0 | 0 | 0 | 0 | 0 | 0 |

⇨

CONFIGURATION EXAMPLE (F)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | ON | 0 | 1 | 1 | 1 | 1 | 1 | 0 | 0 | 0 | 0 | 0 | 0 | 0 | 0 |
| SV11 | ON | 0 | 1 | 0 | 0 | 0 | 0 | 1 | 1 | 1 | 1 | 0 | 0 | 0 | 0 |
| SV12 | ON | 0 | 1 | 0 | 0 | 0 | 0 | 0 | 0 | 0 | 0 | 1 | 1 | 1 | 1 |
| SV20 | ON | 1 | 0 | 0 | 0 | 0 | 0 | 0 | 0 | 0 | 0 | 0 | 0 | 0 | 0 |
| SV21 | ON | 1 | 0 | 0 | 0 | 0 | 0 | 0 | 0 | 0 | 0 | 0 | 0 | 0 | 0 |
| SV22 | ON | 1 | 0 | 0 | 0 | 0 | 0 | 0 | 0 | 0 | 0 | 0 | 0 | 0 | 0 |

CONFIGURATION EXAMPLE (G)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | ON | 0 | 1 | 1 | 1 | 1 | 1 | 0 | 0 | 0 | 0 | 0 | 0 | 0 | 0 |
| SV11 | ON | 0 | 1 | 0 | 0 | 0 | 0 | 1 | 1 | 1 | 1 | 0 | 0 | 0 | 0 |
| SV12 | ON | 0 | 1 | 0 | 0 | 0 | 0 | 0 | 0 | 0 | 0 | 1 | 1 | 1 | 1 |
| SV20 | ON | 0 | 1 | 0 | 0 | 0 | 0 | 0 | 0 | 0 | 0 | 0 | 0 | 0 | 0 |
| SV21 | ON | 0 | 1 | 0 | 0 | 0 | 0 | 0 | 0 | 0 | 0 | 0 | 0 | 0 | 0 |
| SV22 | ON | 0 | 1 | 0 | 0 | 0 | 0 | 0 | 0 | 0 | 0 | 0 | 0 | 0 | 0 |

⇩

CONFIGURATION EXAMPLE (H)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | ON | 0 | 1 | 0 | 0 | 0 | 0 | 0 | 0 | 0 | 0 | 0 | 0 | 0 | 0 |
| SV11 | ON | 0 | 1 | 0 | 0 | 0 | 0 | 0 | 0 | 0 | 0 | 0 | 0 | 0 | 0 |
| SV12 | ON | 0 | 1 | 0 | 1 | 0 | 1 | 0 | 0 | 0 | 0 | 0 | 0 | 0 | 0 |
| SV20 | ON | 0 | 1 | 1 | 1 | 0 | 1 | 0 | 0 | 0 | 0 | 0 | 0 | 0 | 0 |
| SV21 | ON | 0 | 1 | 0 | 0 | 0 | 0 | 1 | 1 | 1 | 1 | 0 | 0 | 0 | 0 |
| SV22 | ON | 0 | 1 | 0 | 0 | 0 | 0 | 0 | 0 | 0 | 0 | 1 | 1 | 1 | 1 |

CONFIGURATION EXAMPLE (I)

| SERVER ID | POWER SUPPLY | RESERVATION STATUS | USAGE STATUS | CONNECTION STATUS OF STORAGE DEVICE ||||||||||||
|---|---|---|---|---|---|---|---|---|---|---|---|---|---|---|
| | | | | STG0 | STG1 | STG2 | STG3 | STG4 | STG5 | STG6 | STG7 | STG8 | STG9 | STG10 | STG11 |
| SV10 | OFF | 0 | 0 | 0 | 0 | 0 | 0 | 0 | 0 | 0 | 0 | 0 | 0 | 0 | 0 |
| SV11 | OFF | 0 | 0 | 0 | 0 | 0 | 0 | 0 | 0 | 0 | 0 | 0 | 0 | 0 | 0 |
| SV12 | OFF | 0 | 0 | 0 | 0 | 0 | 0 | 0 | 0 | 0 | 0 | 0 | 0 | 0 | 0 |
| SV20 | ON | 0 | 1 | 1 | 1 | 1 | 1 | 0 | 0 | 0 | 0 | 0 | 0 | 0 | 0 |
| SV21 | ON | 0 | 1 | 0 | 0 | 0 | 0 | 1 | 1 | 1 | 1 | 0 | 0 | 0 | 0 |
| SV22 | ON | 0 | 1 | 0 | 0 | 0 | 0 | 0 | 0 | 0 | 0 | 1 | 1 | 1 | 1 |

CONTROL METHOD AND INFORMATION PROCESSING SYSTEM

CROSS-REFERENCE TO RELATED APPLICATION

This application is based upon and claims the benefit of priority of the prior Japanese Patent Application No. 2013-225305, filed on Oct. 30, 2013, the entire contents of which are incorporated herein by reference.

FIELD

The embodiments discussed herein are related to a control method and an information processing system.

BACKGROUND

There has been proposed a technique for a computer system including computers and storage devices that are connected through a storage area network (SAN) in which technique a computer and a storage device that execute a data conversion batch are determined in accordance with capabilities of the computers (see Japanese Laid-open Patent Publication No. 2007-328604, for instance). There has been proposed a technique configured to reduce power consumption by changing clock frequency in accordance with processing contents of a program executed by a central processing unit (CPU) (see Japanese Laid-open Patent Publication No. 2003-196083, for instance).

There has been proposed a technique for duplicate systems including a storage device that is connected to an active system or a standby system via a changeover switch in which technique information is shared through the storage device upon changeover from the active system to the standby system (see Japanese Laid-open Patent Publication No. 5-244260, for instance). There has been proposed a technique configured to improve throughput by classification into tasks with frequent use of a CPU and tasks with frequent use of input/output (I/O) and choice of a task in accordance with frequency of use of the CPU and the I/O (see Japanese Laid-open Patent Publication No. 6-12263, for instance).

No technique, however, has been proposed in which power consumption is reduced by control over connection between computers and storage devices and control over power supplies for the computers in accordance with a load of processing executed by the computers.

SUMMARY

According to an aspect of the invention, a control method for an information processing system including a first computer, a second computer, and a plurality of storage devices coupled to the first computer and the second computer through a switch, a processing performance of the second computer being higher than a processing performance of the first computer, the control method includes setting, by the switch, the first computer as a target for connection of the plurality of storage devices; transmitting, by the first computer, data to be processed from the first computer to the plurality of storage devices and thereby storing the data in the plurality of storage devices; switching, by the switch, the target from the first computer to the second computer when the storing is completed; and executing, by the second computer, processing of the data stored in the plurality of storage devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates the example (continuation of FIG. 6) of the operations of the information processing system illustrated in FIG. 2;

FIG. 8 illustrates configuration examples of a management table illustrated in FIG. 3;

FIG. 9 illustrates configuration examples (continuation of FIG. 8) of the management table illustrated in FIG. 3;

FIG. 10 illustrates configuration examples (continuation of FIG. 9) of the management table illustrated in FIG. 3;

FIG. 11 illustrates configuration examples (continuation of FIG. 10) of the management table illustrated in FIG. 3;

FIG. 12 illustrates a configuration example (continuation of FIG. 11) of the management table illustrated in FIG. 3;

DESCRIPTION OF EMBODIMENTS

Hereinbelow, embodiments will be described with reference to the accompanying drawings.

Figure 1:
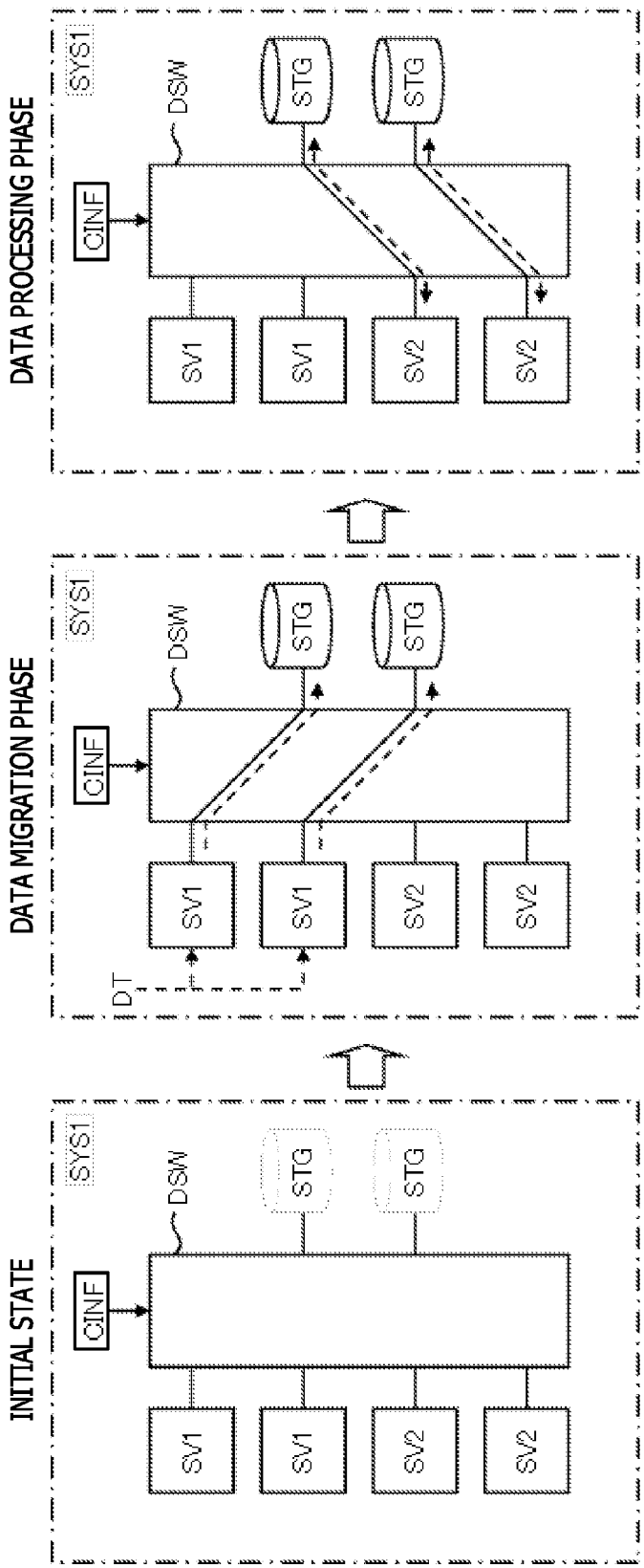
FIG. 1 illustrates an embodiment of an information processing system and a control method for the information processing system.

FIG. 1 illustrates an embodiment of an information processing system and a control method for the information processing system. The information processing system SYS1 of the embodiment includes a plurality of information processing devices SV1, a plurality of information processing devices SV2, and a plurality of storage devices STG. The information processing system SYS1 includes a switching device DSW that connects the information processing devices SV1, SV2, and the storage devices STG and that makes the information processing devices SV1, SV2 process data. The storage devices STG are external storage devices such as hard disk drives (HDDs) and solid state drives (SSDs), for instance.

The information processing devices SV1, SV2 are computer devices such as servers, for instance. The information processing devices SV1, SV2 each include a processor such as a CPU and a memory in which programs that are executed by the processor are stored, for instance. The information processing devices SV1 each have first processing performance. The information processing devices SV2 each have second processing performance higher than the first processing performance.

For instance, number of processor cores mounted in each information processing device SV2 is greater than number of processor cores mounted in each information processing device SV1. Operating frequency of the processor mounted in each information processing device SV2 is higher than operating frequency of the processor mounted in each information processing device SV1. Therefore, power consumption by each information processing device SV2 is greater than power consumption by each information processing device SV1, when the same data is processed by the information processing devices SV1 and SV2. On the other hand, data processing time for each information processing device SV2 is shorter than data processing time for each information processing device SV1.

Transfer rate of data that is transferred from the information processing devices SV1, SV2 to the storage devices STG does not depend on the processing performance of the processors mounted in the information processing devices SV1, SV2. The transfer rate of the data is determined depending on data transfer rates for buses through which the data is transferred. When the same volume of data is transferred from the information processing devices SV1 and SV2 to the storage devices STG, accordingly, transfer time from the information processing devices SV1 is equivalent to transfer time from the information processing devices SV2. Data transfer by the information processing devices SV1 to the storage devices STG may be carried out with lower power consumption than data transfer by the information processing devices SV2 to the storage devices STG is.

The switching device DSW connects any of the information processing devices SV1 or any of the information processing devices SV2 to any of the storage devices STG, based on predetermined connection information CINF. The switching device DSW disconnects any of the information processing devices SV1 or any of the information processing devices SV2 that have been connected to the storage devices STG, based on the connection information CINF.

In initial state, for instance, the switching device DSW maintains non-connected state between the information processing devices SV1, SV2 and the storage devices STG. Before switching from the initial state to data migration phase in which the data is distributed to and placed in the storage devices STG, the switching device DSW makes connection between any of the information processing devices SV1 and any of the storage devices STG, based on the connection information CINF. In the data migration phase, data DT that is used for data processing is distributed to and placed in the plurality of storage devices STG by the information processing devices SV1. In FIG. 1, flow of the data is represented by dashed arrows.

The placement of the data in the storage devices STG by the information processing devices SV1 results in shorter time for the data transfer and lower power consumption than the placement of the data in the storage devices STG by the information processing devices SV2 does.

After the distributed placement of the data DT in the storage devices STG, the switching device DSW interrupts the connection between the plurality of storage devices STG, stored with placed data that is the distributed and placed data, and the information processing devices SV1, based on the connection information CINF. The information processing devices SV1 are powered off after the connection between the information processing devices SV1 and the storage devices STG is interrupted, for instance. The information processing devices SV1 may be powered off in a state in which the connection between the information processing devices SV1 and the storage devices STG is maintained.

Subsequently, the switching device DSW connects the plurality of storage devices STG, stored with the placed data that is the distributed and placed data, to any of the information processing devices SV2, based on the connection information CINF. That is, the storage devices STG where the data is distributed and placed are switched so as to be disconnected from the information processing devices SV1 and so as to be connected to the information processing devices SV2. Thus the storage devices STG where the data is distributed and placed may be handed over from the information processing devices SV1 having the lower processing performance to the information processing devices SV2 having the higher processing performance.

After that, the information processing devices SV2 each process the placed data stored in the storage devices STG. The data processing by the information processing devices SV2 involves greater power consumption but shorter processing time than the data processing by the information processing devices SV1 does.

According to the embodiment illustrated in FIG. 1, as described above, deterioration in the processing performance for the data may be relieved and the power consumption may be reduced by execution of processing in the data migration phase by the information processing devices SV1 and by execution of processing in data processing phase by the information processing devices SV2. Switching of the connection between the information processing devices SV1, SV2 and the storage devices STG is performed by the switching device DSW, so that transfer from the data migration phase to the data processing phase may be attained without occurrence of new data transfer. As a result, the deterioration in the data processing performance due to occurrence of useless data transfer may be checked.

Figure 2:
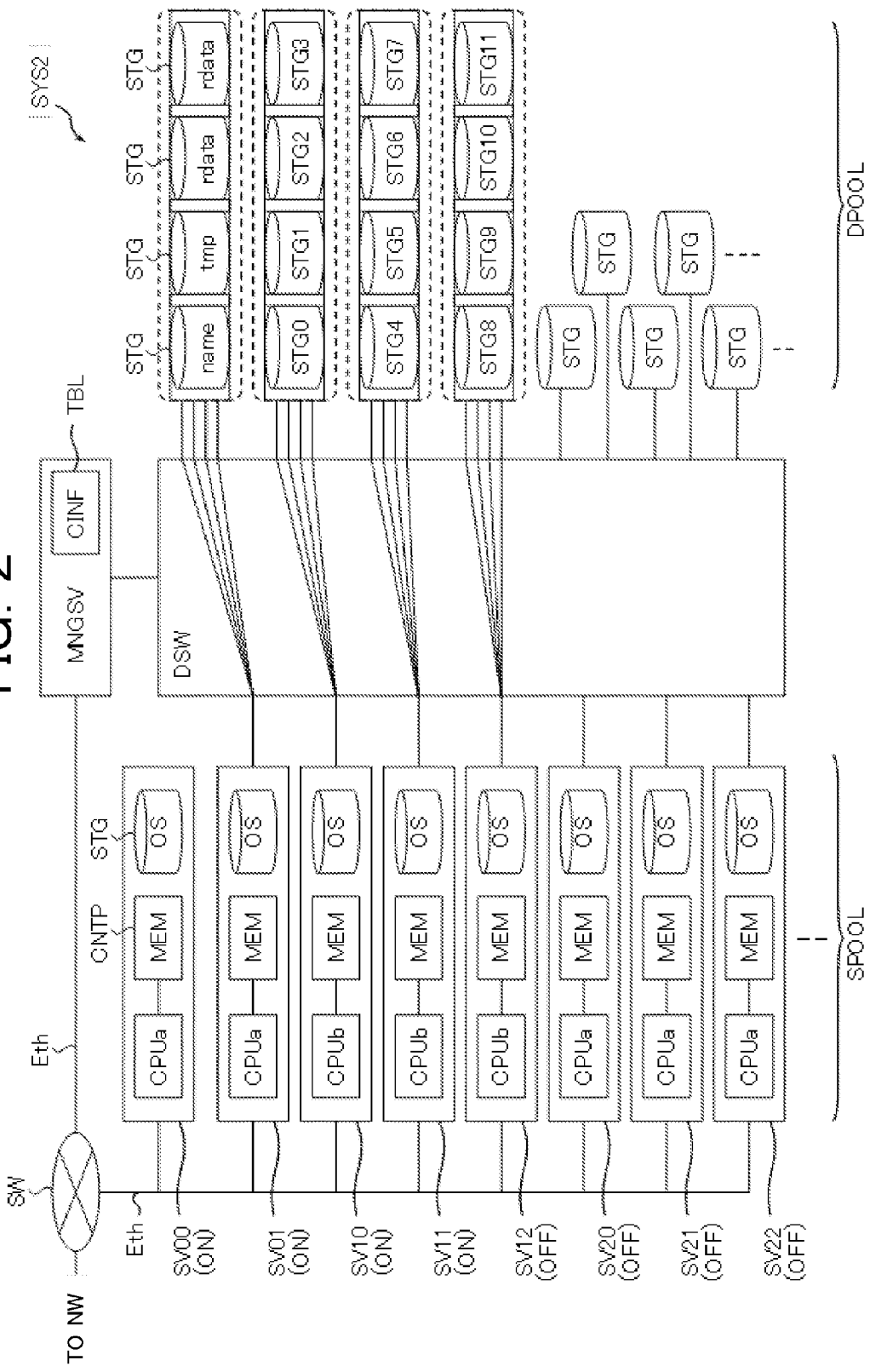
FIG. 2 illustrates another embodiment of an information processing system and a control method for the information processing system.

FIG. 2 illustrates another embodiment of an information processing system and a control method for the information processing system. Elements identical or similar to elements described for the embodiment illustrated in FIG. 1 are designated by the same reference characters and detailed description therefor is omitted.

The information processing system SYS2 of the embodiment includes information processing devices SV0 (SV00, SV01), SV1 (SV10, SV11, SV12), SV2 (SV20, SV21, SV22), a plurality of storage devices STG, the switching device DSW, and a management device MNGSV. The plurality of storage devices STG include storage devices STG0, STG1, STG2, STG3, STG4, STG5, STG6, STG7, STG8, STG9, STG10, and STG11. The storage devices STG are external storage devices such as storage devices having HDDs, SSDs, or the like, for instance. Characters "ON" added to reference characters for some information processing devices SV denote that the information processing devices SV are powered on. Characters "OFF" added to reference characters for other information processing devices SV denote that the information processing devices SV are powered off.

The information processing devices SV0, SV1, SV2, and the management device MNGSV are connected to one another through a network Eth such as Ethernet®, for instance. The management device MNGSV is connected to the information processing devices SV0, SV1, SV2 through a switch SW such as an Ethernet switch. The switch SW may be connected to a network NW such as the Internet. The information processing system SYS2 includes a server pool SPOOL in which the information processing devices SV0, SV1, SV2, and other information processing devices are placed and a disk pool DPOOL in which the storage devices STG are placed, for instance. The server pool SPOOL is an example of an information processing device pool including a plurality of information processing devices that are used as the information processing devices SV1, SV2.

Each of the information processing devices SV0, SV1, SV2 is a computer device such as a server, for instance. The information processing devices SV0, SV1, SV2 each include a processor such as a CPU (CPUa or CPUb) and a memory MEM in which programs that are executed by the processor are stored. The information processing devices SV0, SV1, SV2 each include a storage device STG (HDD or SSD) in which an operating system (OS) is stored. The information processing devices SV0, SV1, SV2 each may operate on an OS stored in a storage device STG placed in the disk pool DPOOL. In description below, the information processing devices SV0, SV1, SV2 may be referred to as servers SV0, SV1, SV2 or servers SV.

The management device MNGSV includes a management table TBL in which connection information CINF are stored. The management device MNGSV controls operations of the switching device DSW, based on the connection information CINF in the management table TBL that have been modified by instructions from the server SV00. The management device MNGSV controls power-on and power-off for the servers SV10 through SV12, SV20 through SV22, based on the connection information CINF in the management table TBL that have been modified by the instructions from the server SV00. The management table TBL may be provided outside the management device MNGSV.

The switching device DSW operates based on control by the management device MNGSV. The switching device DSW makes connection between any of the servers SV placed in the server pool SPOOL and any of the storage devices STG placed in the disk pool DPOOL. The switching device DSW interrupts the connection between any of the servers SV and any of the storage devices STG, based on the control by the management device MNGSV. The storage devices STG connected to the servers SV by the switching device DSW have access performance (6 gigabits per second (6 Gbps), for instance) equivalent to access performance of the internal storage devices provided in the servers SV and external storage devices connected to the servers SV, for instance.

The server SV00 manages operations of the whole information processing system SYS2 that are illustrated in FIGS. 4 through 7 by executing control programs CNTP stored in the memory MEM built in the server SV00. The server SV00 is an example of a control device that outputs instructions to the servers SV1, SV2 for execution of processing and power-off and that outputs instructions to the switching device DSW for the switching.

The server SV01 operates as a parent node that manages operations of the servers SV1, SV2 illustrated in FIGS. 4 through 7. The servers SV10, SV11, SV12 operate as child nodes in the data migration phase in which data is distributed to and placed in the storage devices STG. The servers SV20, SV21, SV22 operate as child nodes in the data processing phase in which the placed data distributed to and placed in the storage devices STG is processed.

The servers SV10, SV11, SV12 each have first processing performance. The servers SV20, SV21, SV22 each have second processing performance higher than the first processing performance. The servers SV00, SV01 have processing performance equivalent to the processing performance of the servers SV2, for instance.

The servers SV10, SV11, SV12 each include Xeon® of Intel Corporation®, as the CPUb, including two CPU cores with clock frequency of 2.3 gigahertz (GHz), for instance. The servers SV20, SV21, SV22 each include two units of Xeon, as the CPUa, each including eight CPU cores with clock frequency of 2.9 GHz, for instance. The servers SV10, SV11, SV12 each have a 32 gigabytes (GB) dual inline memory module (DIMM) of double data rate 3 (DDR3) type as the memory MEM, for instance. The servers SV20, SV21, SV22 each have a 96 GB DIMM of DDR3 type as the memory MEM, for instance.

A state illustrated in FIG. 2 represents a state of the switching device DSW in the data migration phase. In the data migration phase, the management device MNGSV connects the server SV10 to the storage devices STG0, STG1, STG2, STG3, based on the connection information CINF stored in the management table TBL. Based on the connection information CINF, the management device MNGSV connects the server SV11 to the storage devices STG4, STG5, STG6, STG7 and connects the server SV12 to the storage devices STG8, STG9, STG10, STG11.

In the data migration phase, the servers SV20, SV21, SV22 are not connected to the storage device STG and are powered off under control of the management device MNGSV. Dashed frames in the disk pool DPOOL are provided in order to evade complication of the figure. The dashed frames denote that the storage devices STG in the dashed frames are each connected to the servers SV through the switching device DSW.

In the storage devices STG connected to the server SV01, the storage device STG to which an area "name" is allocated is used when the server SV01 operates as the parent node, for instance. The storage device STG to which an area "tmp" is allocated is used as a work area when the server SV01 operates as the parent node. The storage devices STG to which areas "rdata" are allocated store data (raw data) that is not yet distributed to or placed in the storage devices STG0 through STG11. The storage devices STG to which the areas "name", "tmp", and "rdata" are allocated are connected to the server SV01 by the management device MNGSV before the data migration phase is started. Number of the storage devices STG to which the areas "name", "tmp", and "rdata" are allocated is not limited to number disclosed in FIG. 2.

In the data migration phase, the server SV01 reads the raw data stored in the storage devices STG to which the areas "rdata" are allocated, based on an instruction from the server SV00. The server SV01 outputs and distributes the read raw data to the servers SV10, SV11, SV12. The server SV10 writes the received raw data to any of the storage devices STG0, STG1, STG2, STG3. The server SV11 writes the received raw data to any of the storage devices STG4, STG5, STG6, STG7. The server SV12 writes the received raw data to any of the storage devices STG8, STG9, STG10, STG11. The servers SV10, SV11, SV12 may write the received data as replica data to the plurality of storage devices STG. Number of the storage devices STG to which the replica data is written is described in the control programs CNTP, for instance. The number of the storage devices STG to which the replica data is written may be specified through a user terminal connected to the network NW, by a user who makes the servers SV1, SV2 execute data processing.

The server SV00 controls the whole information processing system SYS2. With the control, the processing in the data migration phase and the processing in the data processing phase may be executed with use of an existing software framework that may be run on the servers SV1, SV2, for instance. In other words, the processing in the data migration phase and the processing in the data processing phase may respectively be executed by the servers SV1 and SV2, having different processing performance, with use of the existing software framework. As a result, power consumption resulting from the execution of the processing may be reduced while the performance in the execution of the processing is maintained.

Figure 3:
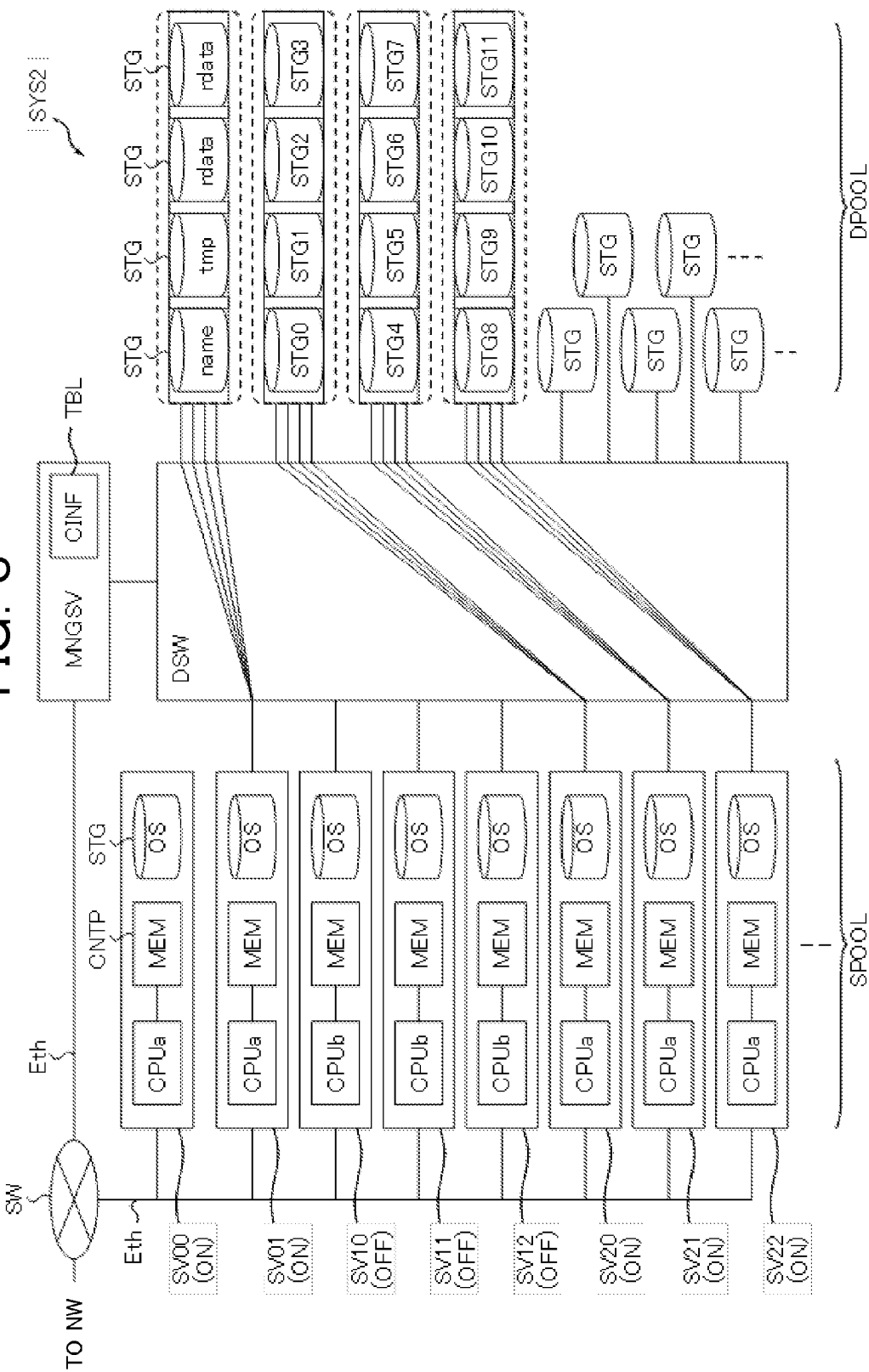
FIG. 3 illustrates another example of a connection state of a switching device in the information processing system illustrated in FIG. 2.

FIG. 3 illustrates another example of a connection state of the switching device DSW in the information processing system SYS2 illustrated in FIG. 2. FIG. 3 illustrates the state of the switching device DSW in the data processing phase into which the data migration phase changes after completion of the processing in the data migration phase illustrated in FIG. 2.

The management device MNGSV interrupts the connection between the server SV10 and the storage devices STG0, STG1, STG2, STG3, based on the connection information CINF in the management table TBL after the completion of the processing in the data migration phase and before the change into the data processing phase. Based on the connection information CINF, the management device MNGSV interrupts the connection between the server SV11 and the storage devices STG4, STG5, STG6, STG7 and interrupts the connection between the server SV12 and the storage devices STG8, STG9, STG10, STG11.

Based on the connection information CINF in the management table TBL, subsequently, the management device MNGSV powers off the servers SV10, SV11, SV12 and connects the server SV20 to the storage devices STG0, STG1, STG2, STG3. Based on the connection information CINF, additionally, the management device MNGSV connects the server SV21 to the storage devices STG4, STG5, STG6, STG7 and connects the server SV22 to the storage devices STG8, STG9, STG10, STG11. The servers SV20, SV21, SV22 are powered on by the management device MNGSV, based on modification by the server SV00 in the connection information CINF in the management table TBL before the completion of the processing in the data migration phase, for instance.

After the connection state illustrated in FIG. 3 is established, the server SV00 is transferred from the data migration phase to the data processing phase. The server SV00 instructs the server SV01 to execute processing of the data distributed to and stored in the storage devices STG0 through STG11. Based on the instruction from the server SV00, the server SV01 makes the servers SV20, SV21, SV22 execute the data processing.

FIGS. 4 through 7 illustrate an example of operations of the information processing system SYS2 illustrated in FIG. 2. With reference to FIGS. 4 through 7, the example will be described in which Hadoop® that is a software framework developed by Apache® Software Foundation and configured to execute distributed processing of large-scale data is run. The information processing system SYS2 illustrated in FIG. 2 may execute software frameworks, distributed processing software, or the like other than Hadoop.

When Hadoop is run on the information processing system SYS2 illustrated in FIG. 2, the server SV01 operates as NameNode that manages data of a file system. The servers SV10 through SV12 or the servers SV20 through SV22 operate as DataNodes that store data to be processed. JobTracker that manages jobs the server SV10 through SV12 and SV20 through SV22 execute has been installed in advance in the server SV01, for instance. JobTracker divides one submitted job into a plurality of MapTasks and a plurality of ReduceTasks and hands the MapTasks and the ReduceTasks to TaskTracker. TaskTracker that executes data analysis by the MapTasks and the ReduceTasks from JobTracker has been installed in advance in the servers SV20 through SV22.

Figure 4:
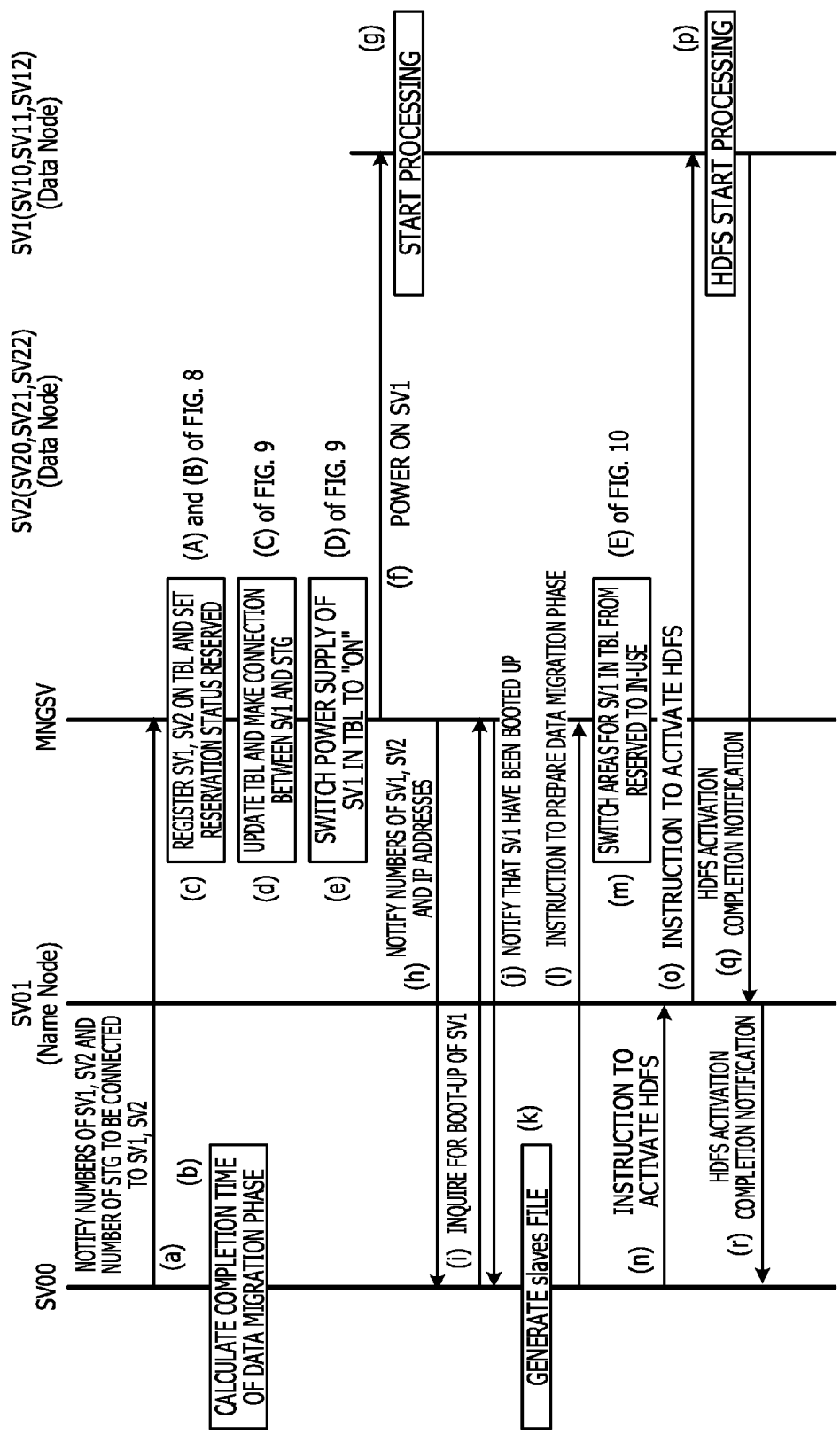
FIG. 4 illustrates an example of operations of the information processing system illustrated in FIG. 2.

Configuration files such as hdfs-site.xml and mapred-site.xml for the execution of Hadoop are generated before start of the operations in FIG. 4 by a user who uses the information processing system SYS2, or the like. Herein, hdfs-site.xml is a file that describes setting of Hadoop Distributed File System® (HDFS) that is used in Hadoop. For instance, mount positions for the storage devices STG that are used are specified therein. HDFS is a file system that virtually handles distributed and placed storage devices as one storage device.

The file "mapred-site.xml" describes settings for Map processing and Reduce processing. For instance, numbers of MapTasks and ReduceTasks that are executed in parallel in JobTracker node are specified in mapred-site.xml. In the Map processing, data to be processed is processed by a predetermined unit and sets of key (such as word) and value (such as number of occurrence) are generated. In the Reduce processing, results of the processing are totaled for each key. Hadoop executes the Map processing and the Reduce processing by using a software framework called MapReduce, for instance.

The control programs CNTP the server SV00 executes are designed in accordance with specifications of data processing the user executes. The control programs CNTP include description that specifies number of the servers SV which are used as DataNodes, description that specifies number of the storage devices STG connected to each server SV, description that specifies size of the raw data to be subjected to data processing, or the like, for instance. Operations of the server SV00 that are illustrated in FIGS. 4 through 7 are attained by the execution of the control programs CNTP.

In FIGS. 4 through 7, thick vertical lines denote that the servers SV and the management device MNGSV are in operation. Rectangles in FIGS. 4 through 7 represent processing executed by the servers SV and the management device MNGSV. Sideways arrows represent notifications or instructions outputted by the servers SV and the management device MNGSV.

Initially, the server SV00 notifies the management device MNGSV of numbers of the servers SV1, SV2 that are to be used in Hadoop and number of the storage devices STG that are to be connected to the servers SV1, SV2 ((a) in FIG. 4). Subsequently, the server SV00 calculates completion time when the processing in the data migration phase is completed, based on size of the raw data stored in the storage devices STG to which the areas "rdata" are allocated ((b) in FIG. 4). That is, the server SV00 finds the completion time when the placement of the data in the storage devices STG by the servers SV10 through SV12 is completed.

The server SV00 finds execution time for the processing in the data migration phase by using equation (1), for instance. The server SV00 finds the completion time by adding the found execution time to current time. Herein, replica number represents number of the storage devices STG to which the same data is written. Bandwidth represents a data transmission rate through the network Eth that connects the servers SV01, SV10, SV11, SV12, SV20, SV21, SV22. Execution time=(raw data size×replica number)/(bandwidth) . . . (1)

Based on the notification from the server SV00, the management device MNGSV registers on the management table TBL the servers SV1, SV2 that are to be used in Hadoop ((c) in FIG. 4). An example of the management table TBL on which the servers SV1, SV2 are registered is illustrated as a configuration example (A) in FIG. 8. In the configuration example (A) of FIG. 8, server identifications (IDs) of the servers SV10 through SV12 and SV20 through SV22 are registered on the management table TBL.

Based on the notification from the server SV00, the management device MNGSV sets areas in the management table TBL that indicate reservation status of the servers SV1, SV2 at "1" that indicates reserved state in place of "0" that indicates non-reserved state. That is, a specified number of servers SV out of the servers SV in the server pool SPOOL illustrated in FIG. 2 are thereby reserved. An example of the management table TBL that represents a state in which the servers SV1, SV2 are reserved is illustrated as a configuration example (B) in FIG. 8. In the configuration example (B) of FIG. 8, the "reservation status" areas corresponding to the reserved servers SV10 through SV12 and SV20 through SV22 are set to be "1".

Based on information received from the server SV00 that represents the number of the storage devices STG to be connected to the servers SV1, the management device MNGSV determines the storage devices STG that are to be connected to the servers SV1 out of the storage devices STG in the disk pool DPOOL illustrated in FIG. 2. The management device MNGSV updates the management table TBL in accordance with determined contents. The management device MNGSV makes connection between the servers SV1 and the storage devices STG that are to be used in the data migration phase ((d) in FIG. 4).

The management device MNGSV includes a connection control part that controls the connection between the servers SV and the storage devices STG through the switching device DSW, for instance. The connection control part controls the switching device DSW, based on the connection information that is configured in the management table TBL and that describes the connection between the servers SV and the storage devices STG. The connection control part makes or interrupts the connection between any of the servers SV and any of the storage devices STG. The connection control part is implemented by software the management device MNGSV executes, for instance, but may be implemented by hardware.

An example of the management table TBL that represents the state in which the servers SV1 and the storage devices STG are connected is illustrated as a configuration example (C) in FIG. 9. The servers SV10 through SV12 and the storage devices STG for which areas "connection status of storage device" are set to be "1" are respectively connected to each other. In the configuration example (C) of FIG. 9, connection between the server SV10 and the storage devices STG0 through STG3, connection between the server SV11 and the storage devices STG4 through STG7, and connection between the server SV12 and the storage devices STG8 through STG11 are established as illustrated in FIG. 2.

Based on the notification from the server SV00, subsequently, the management device MNGSV switches areas in the management table TBL that represent "power supply" of the servers SV1 from "OFF" indicating power-off to "ON" indicating power-on ((e) in FIG. 4). In the initial state, the areas in the management table TBL that represent the power supply are set to be "OFF", so that the servers SV registered on the management table TBL are powered off.

Based on "ON" setting in the areas in the management table TBL that represent "power supply" of the servers SV10, SV11, SV12, the management device MNGSV powers on the servers SV10, SV11, SV12 ((f) in FIG. 4). An example of the management table TBL that represents a state in which the servers SV10, SV11, SV12 are powered on is illustrated as a configuration example (D) in FIG. 9. The servers SV10, SV11, SV12 powered on under the control of the management device MNGSV execute start processing such as OS boot ((g) in FIG. 4).

The management device MNGSV includes a power supply control part that controls the power-on and power-off of the servers SV1, SV2, for instance. Based on "ON" or "OFF" setting in the "power supply" areas configured in the management table TBL, the power supply control part powers on or powers off the servers SV1, SV2. The power supply control part is implemented by software the management device MNGSV executes, for instance, but may be implemented by hardware.

Subsequently, the management device MNGSV notifies the server SV00 of numbers of the servers SV1, SV2 registered on the management table TBL and IP addresses of the servers SV1, SV2 ((h) in FIG. 4).

The server SV00 that has received such notification from the management device MNGSV inquires of the management device MNGSV whether the servers SV10, SV11, SV12 that are to execute the processing in the data processing phase have been booted up or not ((i) in FIG. 4). If the servers SV10, SV11, SV12 have already been booted up, the management device MNGSV outputs to the server SV00 notification indicating that the servers have been booted up ((j) in FIG. 4). The server SV00 waits for the notification from the management device MNGSV indicating that the servers SV10, SV11, SV12 have been booted up.

The server SV00 that has received the IP addresses and the like of the servers SV1, SV2 generates slaves file that describes information including the IP addresses of the servers SV1, SV2 which are used as DataNodes ((k) in FIG. 4). In the slaves file, one IP address is described on each line, for instance. In place of the IP addresses, host names that designate the servers SV1, SV2 which are used as DataNodes may be described in the slaves file.

Subsequently, the server SV00 instructs the management device MNGSV to prepare the execution of the data migration phase ((l) in FIG. 4). Based on such an instruction from the server SV00, the management device MNGSV switches the reservation status areas for the servers SV10, SV11, SV12 in the management table TBL from "1" indicating the reserved state to "0" indicating the non-reserved state. Based on the instruction from the server SV00, the management device MNGSV switches areas in the management table TBL that represent usage status of the servers SV10, SV11, SV12 from "0" indicating not-in-use state to "1" indicating in-use state ((m) in FIG. 4). Thus the servers SV10, SV11, SV12 are brought into a state in which the servers SV10, SV11, SV12 may execute the processing in the data migration phase. An example of the management table TBL that represents the state in which the servers SV10, SV11, SV12 may execute the processing in the data migration phase is illustrated as a configuration example (E) in FIG. 10.

Subsequently, the server SV00 instructs the server SV01 that is NameNode to activate HDFS ((n) in FIG. 4). Based on such an instruction from the server SV00, the server SV01 refers to the configuration files for the servers SV10, SV11, SV12 and instructs the servers SV10, SV11, SV12 to activate HDFS ((o) in FIG. 4). Based on such an instruction from the server SV01, the servers SV10, SV11, SV12 load the memories MEM with HDFS programs from the storage devices STG and start the HDFS programs ((p) in FIG. 4).

The servers SV10, SV11, SV12 having HDFS activated each output to the server SV01 HDFS activation completion notification indicating that activation of HDFS has been completed ((q) in FIG. 4). The server SV00 is notified of the HDFS activation completion notification through the server SV01 ((r) in FIG. 4). The servers SV10, SV11, SV12 may output the HDFS activation completion notification to the server SV01 and the server SV00. In this configuration, the HDFS activation completion notification is not outputted from the server SV01 to the server SV00.

Subsequently, referring to FIG. 5, the server SV00 instructs the server SV01 to execute the processing in the data migration phase ((a) in FIG. 5). The server SV01 having received such an instruction instructs the servers SV10, SV11, SV12 to execute the processing in the data migration phase ((b) in FIG. 5). The servers SV10, SV11, SV12 each execute processing in which the raw data transferred from the server SV01 is distributed and written to the storage devices STG (that is, the processing in the data migration phase) ((c) in FIG. 5).

Subsequently, the server SV00 notifies the management device MNGSV of the completion time of the data migration phase that was calculated in (b) in FIG. 4 ((d) in FIG. 5). The management device MNGSV clocks time that is a predetermined period (five minutes, for instance) ahead of the completion time received from the server SV00 ((e) in FIG. 5). That is, the management device MNGSV sets up setting time calculated by subtraction of the predetermined period from the completion time. The management device MNGSV clocks the setting time set up in such a manner. With the completion time at 10:00 and the predetermined period of five minutes, for instance, the setting time is set to be 9:55. Upon arrival of the setting time that is the predetermined period ahead of the completion time, the management device MNGSV switches the areas in the management table TBL that represent the power supply of the servers SV20, SV21, SV22 from "OFF" to "ON" ((f) in FIG. 5). That is, the server SV00 powers on the servers SV20, SV21, SV22 at the setting time prior to the completion time when the placement of the data in the storage devices STG is completed.

Figure 5:
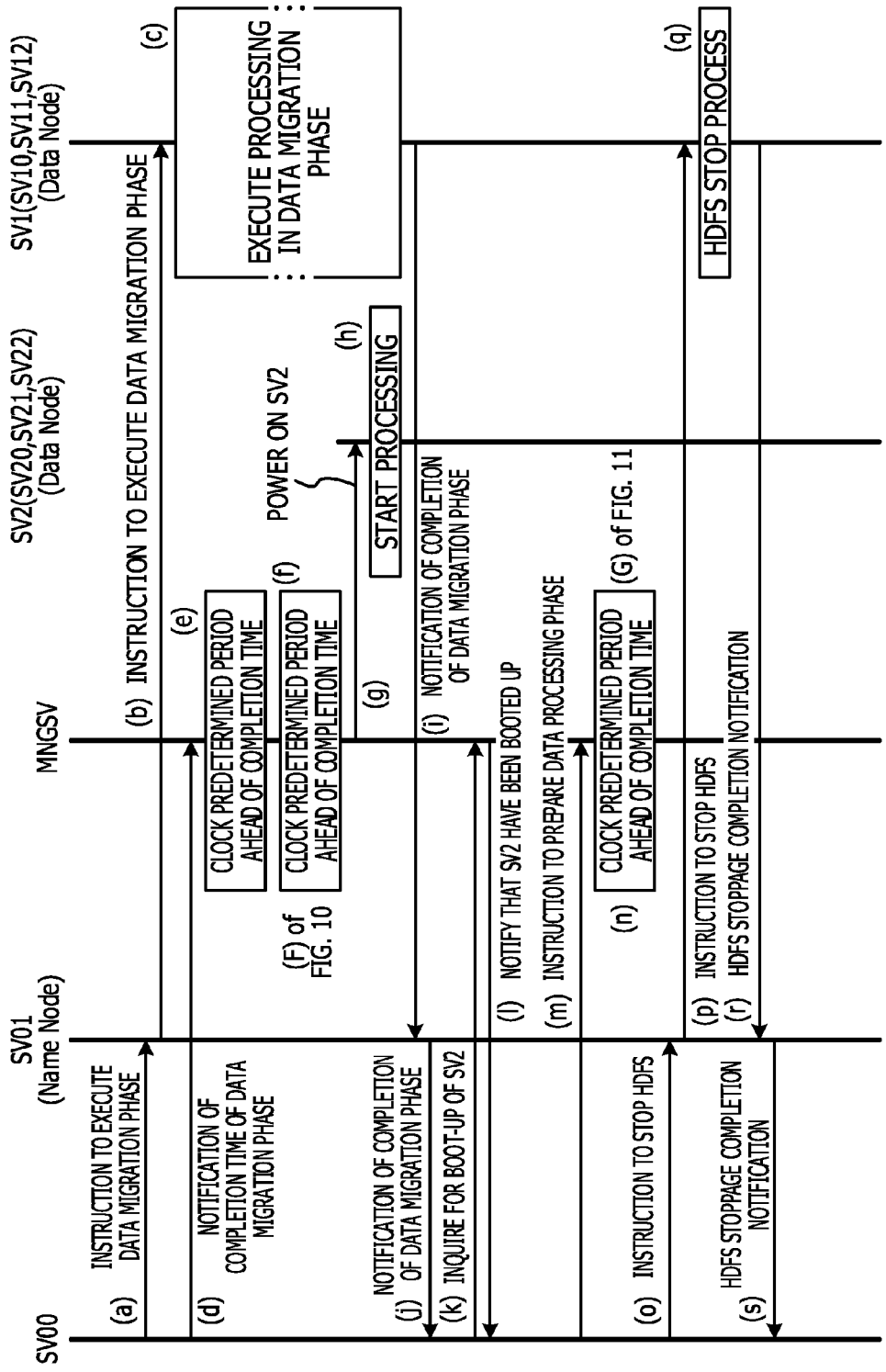
FIG. 5 illustrates the example (continuation of FIG. 4) of the operations of the information processing system illustrated in FIG. 2.

Based on "ON" setting in the areas in the management table TBL that represent the power supply of the servers SV2, the management device MNGSV powers on the servers SV20, SV21, SV22 ((g) in FIG. 5). An example of the management table TBL that represents a state in which the servers SV20, SV21, SV22 are powered on is illustrated as a configuration example (F) in FIG. 10. The servers SV20, SV21, SV22 powered on under the control of the management device MNGSV execute start processing such as OS boot ((h) in FIG. 5).

In the embodiment, the servers SV20 through SV22 are powered on while the servers SV10 through SV12 execute the processing in the data migration phase, and the servers SV20 through SV22 then initiate the start processing. The start processing for the servers SV20 through SV22 are completed before the processing in the data migration phase by the servers SV10 through SV12 is completed. In other words, the predetermined period calculated by subtraction of the time when the "power supply" areas for the servers SV20 through SV22 in the management table TBL are switched to "ON" from the completion time of the data migration phase is a period from the power-on to completion of the start processing in the servers SV20 through SV22. Thus useless time taken for the switching of the servers SV may be minimized on condition that the processing in the data migration phase and the processing in the data processing phase are executed by the different servers SV. As a result, the data processing performance may be improved in comparison with a system in which the servers SV20 through SV22 are powered on after the data migration phase.

When the placement of the data in the storage devices STG is completed, the servers SV10, SV11, SV12 each notify the server SV01 of the completion of the data migration phase ((i) in FIG. 5). The server SV00 is notified of the completion notification for the data migration phase through the server SV01 ((j) in FIG. 5). The servers SV10, SV11, SV12 may output the completion notification for the data migration phase to the server SV01 and the server SV00. In this configuration, the completion notification for the data migration phase is not outputted from the server SV01 to the server SV00.

The server SV00 that has received the completion notification for the data migration phase inquires of the management device MNGSV whether the server SV20, SV21, SV22 that are to execute the processing in the data processing phase have been booted up or not ((k) in FIG. 5). If the servers SV20, SV21, SV22 have already been booted up, the management device MNGSV outputs to the server SV00 notification indicating that the servers have been booted up ((l) in FIG. 5). The server SV00 waits for the notification from the management device MNGSV indicating that the servers SV20, SV21, SV22 have been booted up.

Subsequently, the server SV00 instructs the management device MNGSV to prepare the execution of the data processing phase ((m) in FIG. 5). Based on such an instruction from the server SV00, the management device MNGSV switches areas in the management table TBL that represent usage status of the servers SV20, SV21, SV22 from "0" indicating the not-in-use state to "1" indicating the in-use state ((n) in FIG. 5). Thus the servers SV20, SV21, SV22 are brought into a state in which the servers SV20, SV21, SV22 may execute the processing in the data processing phase. An example of the management table TBL that represents the state in which the servers SV20, SV21, SV22 may execute the processing is illustrated as a configuration example (G) in FIG. 11.

Subsequently, the server SV00 instructs the server SV01 to stop HDFS that is being executed by the servers SV10, SV11, SV12 ((o) in FIG. 5). Based on such an instructions from the server SV00, the server SV01 instructs stoppage of HDFS that is being executed by the servers SV10, SV11, SV12 ((p) in FIG. 5). Based on such an instruction from the server SV01, the servers SV10, SV11, SV12 each stop the execution of the HDFS programs ((q) in FIG. 5).

The servers SV10, SV11, SV12 having HDFS stopped each output to the server SV01 HDFS stoppage completion notification indicating that HDFS has been stopped ((r) in FIG. 5). The server SV00 is notified of the HDFS stoppage completion notification through the server SV01 ((s) in FIG. 5). The servers SV10, SV11, SV12 may output the HDFS stoppage completion notification to the server SV01 and the server SV00. In this configuration, the HDFS stoppage completion notification is not outputted from the server SV01 to the server SV00.

Subsequently, referring to FIG. 6, the server SV00 that has received the HDFS stoppage completion notification outputs to the management device MNGSV an instruction that the storage devices STG0 through STG11 being connected to the servers SV10, SV11, SV12 be switched to the servers SV20, SV21, SV22 ((a) in FIG. 6). Based on the instruction from the server SV00, the management device MNGSV updates the management table TBL. The management device MNGSV disconnects the servers SV10, SV11, SV12 and the storage devices STG, and connects the disconnected storage devices STG to the server SV20, SV21, SV22 ((b) in FIG. 6). An example of the management table TBL that represents a state in which the servers SV20, SV21, SV22 and the storage devices STG are connected is illustrated as a configuration example (H) in FIG. 11. In the configuration example (H) of FIG. 11, value "1" set in the areas of "connection status of storage device" for the servers SV10 through SV12 is changed to "0". Then the connection between the servers SV10 through SV12 and the storage devices STG is cancelled. The servers SV20 through SV22 and the storage devices STG for which the areas "connection status of storage device" are set to be "1" are connected to each other. In the configuration example (H) of FIG. 11, connection between the server SV20 and the storage devices STG0 through STG3, connection between the server SV21 and the storage devices STG4 through STG7, and connection between the server SV22 and the storage devices STG8 through STG11 are established as illustrated in FIG. 3.

Figure 6:
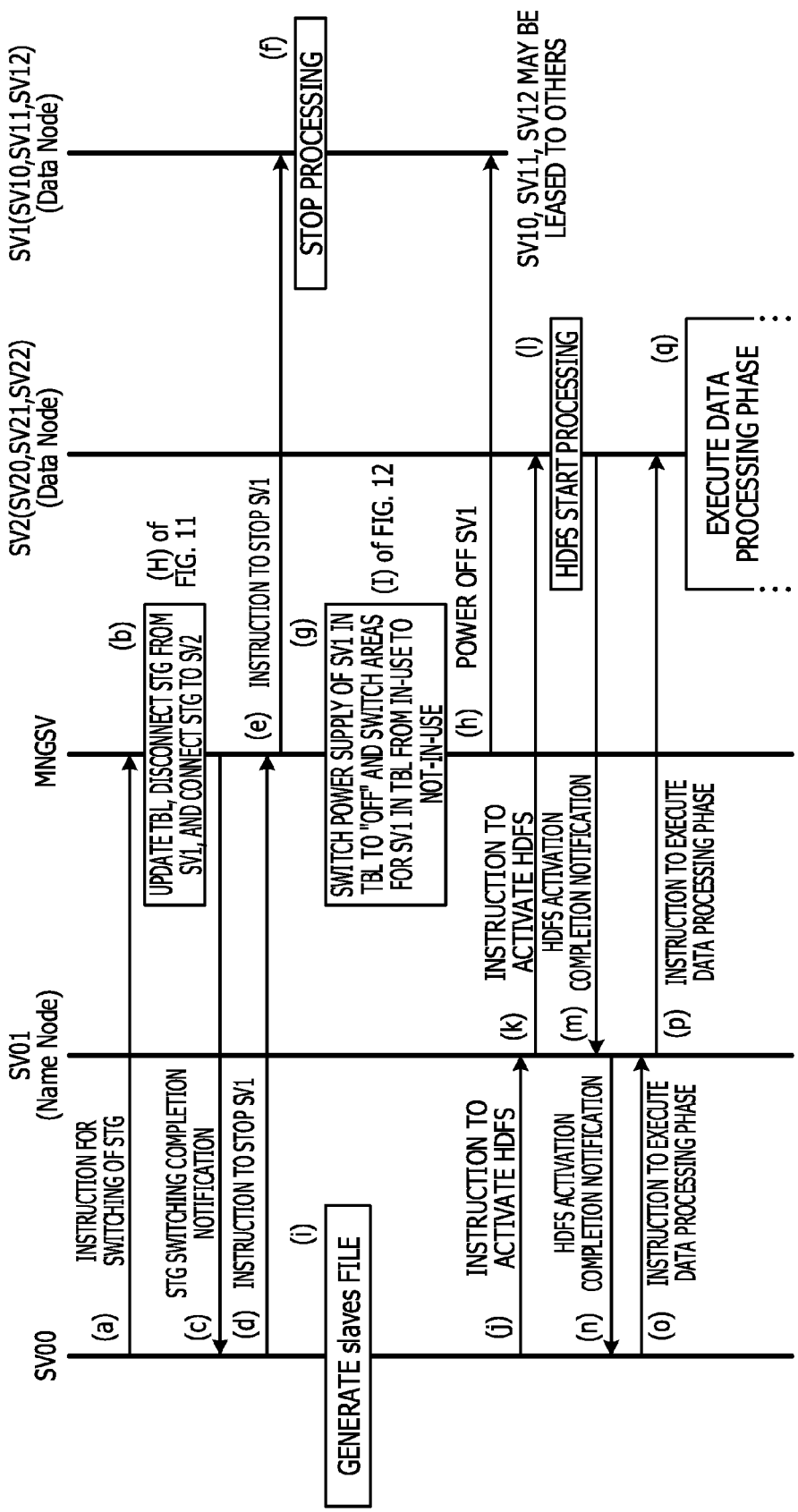
FIG. 6 illustrates the example (continuation of FIG. 5) of the operations of the information processing system illustrated in FIG. 2.

The management device MNGSV outputs to the server SV00 switching completion notification indicating that the storage devices STG have been switched from the servers SV10, SV11, SV12 to the server SV20, SV21, SV22 ((c) in FIG. 6). The server SV00 that has received the switching completion notification instructs the management device MNGSV to stop the servers SV10, SV11, SV12 ((d) in FIG. 6). Herein, an instruction to stop the servers SV10, SV11, SV12 includes an instruction for shutdown processing for the OS and an instruction for the power-off.

Based on the instruction from the server SV00, the management device MNGSV instructs the servers SV10, SV11, SV12 to shut down ((e) in FIG. 6). The servers SV10, SV11, SV12 instructed to shut down from the management device MNGSV execute stop processing such as shut-down processing for the OS ((f) in FIG. 6).

The management device MNGSV switches the areas in the management table TBL that represent the power supply of the servers SV10, SV11, SV12 from "ON" to "OFF". The management device MNGSV switches the areas in the management table TBL that represent the usage status of the servers SV10, SV11, SV12 from "1" indicating the in-use state to "0" indicating the not-in-use state ((g) in FIG. 6).

Based on the "OFF" setting in the areas in the management table TBL that represent the power supply of the servers SV1, the management device MNGSV powers off the servers SV10, SV11, SV12 ((h) in FIG. 6). After the stop processing such as the shut-down processing for the OS by the servers SV10, SV11, SV12 is completed, the management device MNGSV powers off the servers SV10, SV11, SV12. An example of the management table TBL that represents a state in which the servers SV10, SV11, SV12 are powered off is illustrated as a configuration example (I) in FIG. 12.

The areas in the management table TBL that represent the reservation status of the servers SV10 through SV12 have been set to be "0" by (n) in FIG. 5. By setting into "0" of the areas that represent the usage status, accordingly, the servers SV10 through SV12 that have been powered off are returned to the server pool SPOOL. The servers SV10 through SV12 returned to the server pool SPOOL may be leased to other users or the like. That is, the servers SV10 through SV12 for which the data migration phase has been completed are returned to the server pool SPOOL, and thus usage efficiency of the information processing system SYS2 may be increased in comparison with a system in which the servers SV10 through SV12 are not returned to the server pool SPOOL.

On the other hand, the server SV00 generates slaves file that describes information including the IP addresses of the servers SV20, SV21, SV22 which are used as DataNodes in the data processing phase ((i) in FIG. 6). Information notified from the management device MNGSV in (h) in FIG. 4 before generation of the slaves file is used as the information including the IP addresses.

Subsequently, the server SV00 instructs the server SV01 to activate HDFS ((j) in FIG. 6). Based on such an instruction from the server SV00, the server SV01 refers to the configuration files for the servers SV20, SV21, SV22 and instructs the servers SV20, SV21, SV22 to activate HDFS ((k) in FIG. 6). Based on such an instruction from the server SV01, the servers SV20, SV21, SV22 load the memories MEM with the HDFS programs from the storage devices STG and start the HDFS programs ((l) in FIG. 6).

The servers SV20, SV21, SV22 having HDFS activated each output to the server SV01 the HDFS activation completion notification indicating that the activation of HDFS has been completed ((m) in FIG. 6). The server SV00 is notified of the HDFS activation completion notification through the server SV01 ((n) in FIG. 6).

Subsequently, the server SV00 instructs the server SV01 to execute the processing in the data processing phase ((o) in FIG. 6). The server SV01 having received such an instruction instructs the servers SV20, SV21, SV22 to execute the processing in the data processing phase ((p) in FIG. 6). The servers SV20, SV21, SV22 each execute the processing on the data distributed to and placed in the storage devices STG in the data migration phase (that is, the processing in the data processing phase) ((q) in FIG. 6). The processing in the data processing phase includes the Map processing and the Reduce processing for Hadoop.

Once the processing on the data distributed to and placed in the storage devices STG is completed, subsequently referring to FIG. 7, the servers SV20, SV21, SV22 each notify the server SV01 of the completion of the data processing phase ((a) in FIG. 7). The server SV00 is notified of the completion notification for the data processing phase through the server SV01 ((b) in FIG. 7).

Subsequently, the server SV00 instructs the server SV01 to stop HDFS that is being executed by the servers SV20, SV21, SV22 ((c) in FIG. 7). Based on such an instruction from the server SV00, the server SV01 instructs stoppage of HDFS that is being executed by the servers SV20, SV21, SV22 ((d) in FIG. 7). Based on such an instruction from the server SV01, the servers SV20, SV21, SV22 each stop the execution of the HDFS programs ((e) in FIG. 7).

The servers SV20, SV21, SV22 having HDFS stopped each output to the server SV01 the HDFS stoppage completion notification indicating that HDFS has been stopped ((f) in FIG. 7). The server SV00 is notified of the HDFS stoppage completion notification through the server SV01 ((g) in FIG. 7).

Subsequently, the server SV00 instructs the management device MNGSV to stop the servers SV20, SV21, SV22 ((h) in FIG. 7). Herein, an instruction to stop the servers SV20, SV21, SV22 includes the instruction for the shutdown processing for the OS and the instruction for the power-off. Based on the instruction from the server SV00, the management device MNGSV instructs the servers SV20, SV21, SV22 to shut down ((i) in FIG. 7). The servers SV20, SV21, SV22 instructed to shut down from the management device MNGSV execute the stop processing such as the shut-down processing for the OS ((j) in FIG. 7).

Subsequently, the management device MNGSV switches the areas in the management table TBL that represent the power supply of the servers SV20, SV21, SV22 from "ON" to "OFF". The management device MNGSV switches the areas in the management table TBL that represent the usage status of the servers SV20, SV21, SV22 from "1" indicating the in-use state to "0" indicating the not-in-use state ((k) in FIG. 7).

Based on "OFF" setting in the areas in the management table TBL that represent the power supply of the servers SV2, the management device MNGSV powers off the servers SV20, SV21, SV22 ((l) in FIG. 7). After the shut-down processing for the OS or the like by the servers SV20, SV21, SV22 is completed, the management device MNGSV powers off the servers SV20, SV21, SV22. In addition, the management device MNGSV updates the management table TBL and disconnects the storage devices STG from the servers SV20, SV21, SV22 ((m) in FIG. 7). Thus the management table TBL is returned into a state illustrated in the configuration example (A) of FIG. 8.

When the processing in the data migration phase and the processing in the data processing phase are repetitively executed, the management device MNGSV may set the servers SV into low-power-consumption mode such as sleep mode, based on the instruction from the server SV00 to stop the servers SV. In this arrangement, for instance, the management table TBL illustrated in FIGS. 8 through 12 includes areas representing sleep in addition to the areas representing the power supply. Based on "sleep" setting in the areas representing the sleep in the management table TBL, the management device MNGSV sets the servers SV into the sleep mode. When the servers SV are set into the sleep mode in the stop processing of (f) in FIG. 6 and (j) in FIG. 7, the management device MNGSV switches the areas representing the sleep to "sleep cancelled" indicating cancellation of the sleep mode in the second and later processing of (e) in FIG. 4 and (f) in FIG. 5. The "power supply" is maintained in "ON" state in the second and later processing of (e) in FIG. 4 and (f) in FIG. 5. Upon the second and later instruction of (f) in FIG. 4 and (g) in FIG. 5, the management device MNGSV carries out the cancellation of the sleep of the servers SV instead of the power-on.

FIGS. 8 through 12 illustrate the configuration examples of the management table TBL illustrated in FIG. 3. With progression of the operations illustrated in FIGS. 4 through 7, the management table TBL sequentially changes into the states (the configuration examples (A) through (I)) illustrated in FIGS. 8 through 12. The shaded areas illustrated in FIGS. 8 through 12 denote that setting values in the last configuration example have been changed.

The management table TBL has the areas of "power supply", "reservation status", "usage status", and "connection status of storage device" for each of the server IDs that are the IDs of the registered servers SV. Information stored in the areas of "power supply", "reservation status", "usage status", and "connection status of storage device" is an example of the connection information CINF illustrated in FIG. 2.

The area "power supply" is set to be "ON" when the server SV is to be powered on or the area "power supply" is set to be "OFF" when the server is to be powered off. The area "reservation status" is set to be "1" when the server SV in the server pool SPOOL is to be reserved (ensured) or the area "reservation status" is set to be "0" when the server SV in the server pool SPOOL is not to be reserved (ensured). The area "usage status" is set to be "1" when the server SV having "reservation status" set to be "1" is to be operated or the area "usage status" is set to be "0" when the operation of the server SV is completed. When the area "usage status" is set to be "1", the area "reservation status" set to be "1" is returned to "0". That is, the areas "reservation status" and "usage status" are not simultaneously set to be "1".

The area "connection status of storage device" is provided for each of the storage devices STG that may be connected to the servers SV. The area "connection status of storage device" is set to be "1" when the storage device STG is connected to the server SV or the area "connection status of storage device" is set to be "0" when the storage device STG is disconnected from the server SV. In FIGS. 8 through 12, the areas "connection status of storage device" are provided corresponding to the twelve storage devices STG0 through STG11 illustrated in FIG. 2. The areas "connection status of storage device" may be provided corresponding to more than twelve storage devices STG in the disk pool DPOOL that may be connected to the servers SV.

Changes in the management table TBL illustrated in FIGS. 8 through 12 have been described for the example of the operations illustrated in FIGS. 4 through 7 and thus redundant description is omitted. In the configuration example (H) of FIG. 11, the areas "connection status of storage device" for the servers SV10 through SV12 and the storage devices STG0 through STG11 are set to be "0" after the processing in the data migration phase is completed, and the storage devices STG are then disconnected from the servers SV10 through SV12. By treatment as void of "connection status of storage device" corresponding to the servers SV having "usage status" set to be "0", however, the areas "connection status of storage device" for the storage devices STG corresponding to the servers SV1 for which the data migration phase is completed are allowed to be maintained at "1". In other words, omission of an operation of returning "connection status of storage device" to "0" is allowed by control over the connection between the servers SV and the storage devices STG based on product of logic set in "connection status of storage device" and logic set in "usage status".

In the configuration examples (E) and (F) of FIG. 10 and the configuration examples (G) and (H) of FIG. 11, "reservation status" corresponding to the servers SV10 through SV12 may be maintained at "1" while "power supply" therefor is set to be "ON". That is, "reservation status" may be set to be "1" while the servers SV10 through SV12 are leased from the server pool SPOOL or "reservation status" may be set to be "0" while the servers SV10 through SV12 are in returned state.

Figure 13:
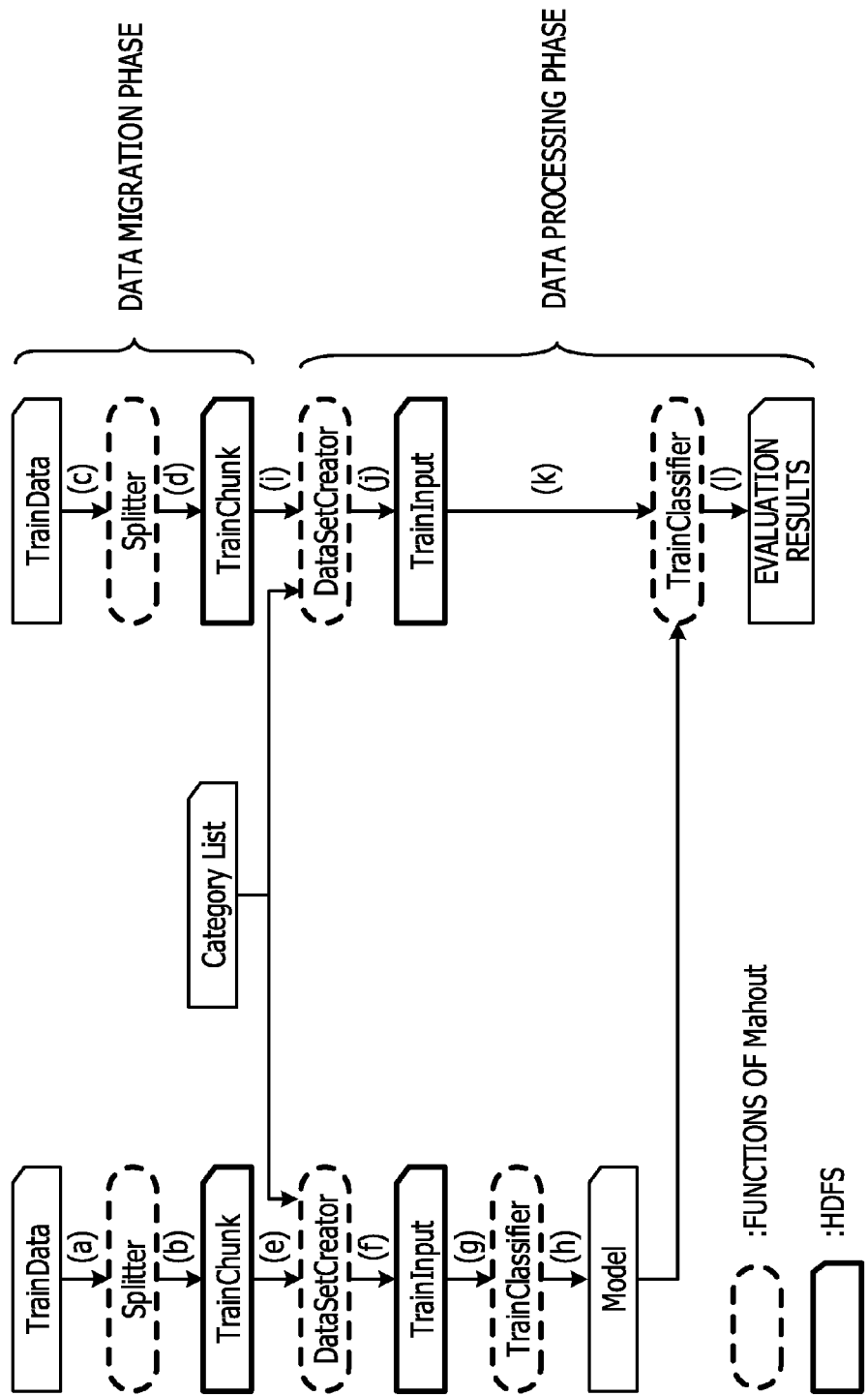
FIG. 13 illustrates an example in which the operations illustrated in FIGS. 4 through 7 are applied to the information processing system illustrated in FIG. 2.

FIG. 13 illustrates an example in which the operations illustrated in FIGS. 4 through 7 are applied to the information processing system SYS2 illustrated in FIG. 2. FIG. 13 illustrates the example in which Mahout® is run on Hadoop to generate a classifier through machine learning, for instance. Mahout is one of libraries for data mining by which correlations among a large amount of data are found out.

Based on a text included in a Web page on the world wide web (WWW), for instance, the classifier generated through the machine learning illustrated in FIG. 13 determines which category the Web page belongs to. In FIG. 13, processes illustrated by thick dashed lines denote functions that may be attained in Mahout. Rectangles of thick solid lines that each have a chamfered corner denote files that are handled in HDFS.

When the classifier is generated through the machine learning, TrainData for learning is inputted into Splitter ((a) in FIG. 13). Splitter divides TrainData into a plurality of Chunks (TrainChunks) that each represent a unit of data stored in HDFS ((b) in FIG. 13). In Hadoop, size of each Chunk is 64 megabytes (MB), for instance.

For evaluation of the classifier (Model), on the other hand, TestData of which category is known is inputted into Splitter ((c) in FIG. 13). Splitter divides TestData into a plurality of Chunks (TestChunks) that are handled in HDFS ((d) in FIG. 13).

The processes of dividing TrainData and TestData into Chunks by Splitter are sequentially executed in the data migration phase illustrated in (c) of FIG. 6, for instance. That is, in the example illustrated in FIGS. 4 through 7, a plurality of TrainChunks and a plurality of TestChunks that are generated by Splitter are distributed and written to any of the storage devices STG by the servers SV10, SV11, SV12.

The TrainChunks obtained through Splitter are inputted into DataSetCreator ((e) in FIG. 13). DataSetCreator generates TrainInput that is input data for the classifier, based on CategoryList in which a plurality of categories are described ((f) in FIG. 13). TrainInput is inputted into TrainClassifier ((g) in FIG. 13). TrainClassifier generates the classifier (Model) by using TrainInput ((h) in FIG. 13).

The TestChunks obtained through Splitter are inputted into DataSetCreator ((i) in FIG. 13). DataSetCreator generates TestInput that is input data for the evaluation of the classifier, based on CategoryList ((j) in FIG. 13). TestInput is inputted into TestClassifier ((k) in FIG. 13). TestClassifier activates the classifier (Model) by using TestInput and outputs evaluation results that represent accuracy of the classifier ((l) in FIG. 13).

The processes by DataSetCreator, TrainClassifier, and TestClassifier are sequentially executed in the data processing phase illustrated in (q) of FIG. 6, for instance. That is, in the example illustrated in FIGS. 4 through 7, the processes by DataSetCreator, TrainClassifier, and TestClassifier are executed by the servers SV20, SV21, SV22 connected to the storage devices STG where the data is distributed and placed.

Figure 14:
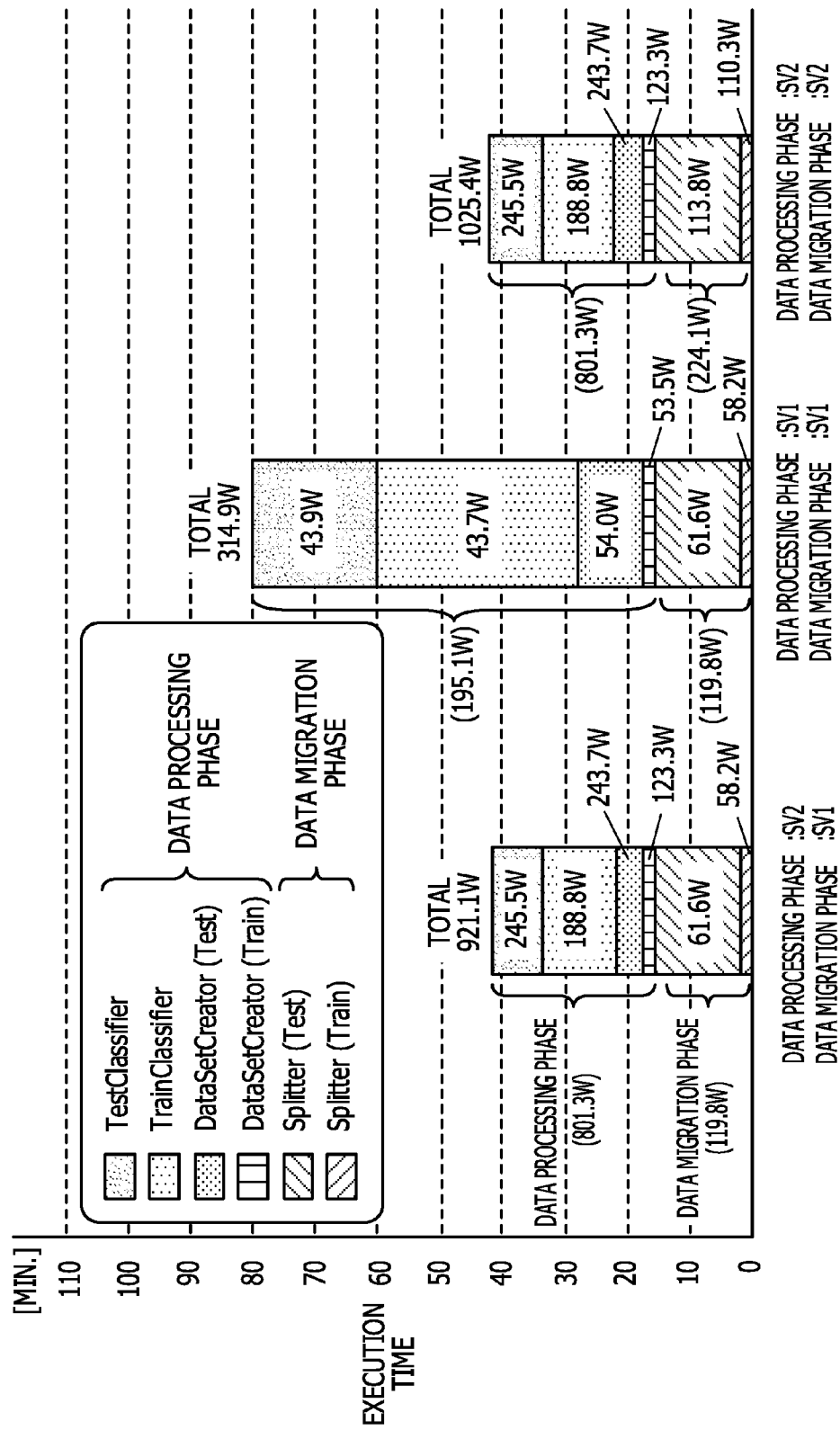
FIG. 14 illustrates examples of execution time and power consumption spent for processes illustrated in FIG. 13.

FIG. 14 illustrates examples of execution time and power consumption spent for the processes illustrated in FIG. 13. Three stacked column charts illustrated in FIG. 14 represent stacks of the execution time for the processes carried out by the servers SV1 (or SV2). The power the servers SV1 (or SV2) consume for the execution of the processes is added to elements of the stacked column charts.

The stacked column chart illustrated on left side in FIG. 14 represents an example in which the servers SV1 (SV10 through SV12) are used to execute the processing in the data migration phase and in which the servers SV2 (SV20 through SV22) are used to execute the processing in the data processing phase, as illustrated in FIGS. 4 through 7.

The stacked column chart illustrated at center in FIG. 14 represents a comparative example contrasted to the stacked column chart illustrated on the left side in FIG. 14. The stacked column chart illustrated at center in FIG. 14 represents the example in which the servers SV1 (SV10 through SV12) are used to execute the processing in the data migration phase and the processing in the data processing phase. The stacked column chart illustrated on right side in FIG. 14 represents a comparative example contrasted to the stacked column chart illustrated on the left side in FIG. 14. The stacked column chart illustrated on the right side in FIG. 14 represents the example in which the servers SV2 (SV20 through SV22) are used to execute the processing in the data migration phase and the processing in the data processing phase.

As disclosed in the equation (1), the execution time for the processing in the data migration phase is determined independently of the processing performance of the servers SV1, SV2 and depending on the bandwidth of the network Eth. Accordingly, the execution time for the processing in the data migration phase is generally the same, whether the processing is executed by the servers SV1 or by the servers SV2.

The clock frequency of the servers SV2 is higher than the clock frequency of the servers SV1, and the processing performance of the servers SV2 is higher than the processing performance of the servers SV1. Therefore, power consumption (224.1 W) for the processing in the data migration phase executed by the servers SV2 is greater than power consumption (119.8 W) for the processing in the data migration phase executed by the servers SV1. Similarly, power consumption (801.3 W) for the processing in the data processing phase executed by the servers SV2 is greater than power consumption (195.1 W) for the processing in the data processing phase executed by the servers SV1.

Accordingly, the power consumption may be reduced, while the performance is maintained, by the execution of the processing in the data migration phase with use of the servers SV1 and by the execution of the processing in the data processing phase with use of the servers SV2. That is, the power consumption may be reduced in comparison with the example in which the processing in the data migration phase and the processing in the data processing phase are executed with use of the servers SV2. Besides, the execution time may be shortened in comparison with the example in which the processing in the data migration phase and the processing in the data processing phase are executed with use of the servers SV1.

In the embodiment illustrated in FIGS. 2 through 14, as described above, the deterioration in the data processing performance may be relieved and the power consumption may be reduced as in the embodiment illustrated in FIG. 1.

In the above embodiment, the whole information processing system SYS2 is controlled by the server SV00 so that the processing in the data migration phase and the processing in the data processing phase are executed. Thus the processing in the data migration phase and the processing in the data processing phase may respectively be executed by the servers SV1 and SV2, having the different processing performance, with use of the existing software framework that is run on the servers SV1 and SV2, for instance. As a result, the power consumption resulting from the execution of the processing may be reduced while performance is maintained.

The servers SV20 through SV22 are powered on and initiate the start processing while the servers SV10 through SV12 execute the processing in the data migration phase, and thus useless time taken for the switching of the servers SV may be minimized. As a result, the data processing performance may be improved in comparison with a system in which the servers SV20 through SV22 are powered on after the data migration phase. In addition, the servers SV10 through SV12 for which the data migration phase has been completed are returned to the server pool SPOOL, and thus the usage efficiency of the information processing system SYS2 may be increased in comparison with a system in which the servers SV10 through SV12 are not returned to the server pool SPOOL.

Features and advantages of the embodiments will be apparent from the above description of embodiments. It is intended that claims cover the features and the advantages of the embodiments as mentioned above within a scope not departing from the sprits and the scope of the claims. Furthermore, it is perceived that those skilled in the art may easily conceive every improvement and modification, and the scope of the embodiments having the inventiveness is not intended to be limited to the above description but may be based on appropriate improvements and equivalents which are included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method for an information processing system including a first computer, a second computer, a control device, and a plurality of storage devices coupled to the first computer and the second computer through a switch, the control device being coupled to the first computer, the second computer and the switch, a processing performance of the second computer being higher than a processing performance of the first computer, the control method comprising:
   setting, by the switch, the first computer as a target for connection of the plurality of storage device;
   outputting, by the control device, an instruction to transmit data from the first computer to the plurality of storage devices, to the first computer;
   transmitting, by the first computer, the data from the first computer to the plurality of storage devices and thereby storing the data in the plurality of storage devices;
   determining, by the control device, a completion time indicating time of completion of the storing the data in the plurality of storage devices, based on the data;
   powering on the second computer by the control device at a time that is prior to the determined completion time;
   outputting, by the control device, an instruction to cancel connection between the first computer and the plurality of storage devices and an instruction to make connection between the second computer and the plurality of storage devices, to the switch, when the storing is completed;
   switching, by the switch, the target from the first computer to the second computer when the storing is completed;
   outputting, by the control device, an instruction to process the data to the second computer after the connection is made; and
   executing, by the second computer, processing of the data stored in the plurality of storage devices.

2. The control method according to claim 1, further comprising:
   outputting, by the control device, an instruction to power off the first computer, when the connection between the first computer and the plurality of storage devices is cancelled.

3. The control method according to claim 1, wherein the determining includes:
   obtaining an execution time for processing of the storing the data transmitted from the first computer in the plurality of storage devices, by dividing a value, obtained from multiplication of volume of the data by number of storage devices to which the data is written out of the plurality of storage devices, by a data transmission rate through a network that couples the first computer and the second computer; and
   adding the execution time to current time.

4. The control method according to claim 1, wherein the powering on includes determining the time at which the second computer is powered on by subtraction of a period from the powering on the second computer to completion of start processing in the second computer from the completion time.

5. An information processing system, comprising:
   a first computer;
   a second computer, a processing performance of the second computer being higher than a processing performance of the first computer;
   a switch;
   a control device coupled to the first computer, the second computer and the switch; and
   a plurality of storage devices coupled to the first computer and the second computer through the switch, wherein
      the switch is configured to set the first computer as a target for connection of the plurality of storage devices,
      the control device is configured to output an instruction to transmit data from the first computer to the plurality of storage devices, to the first computer,
      the first computer is configured to transmit the data from the first computer to the plurality of storage devices and thereby store the data in the plurality of storage devices,
      the control device is configured to
         determine a completion time indicating time of completion of the storing the data in the plurality of storage devices, based on the data,
         power on the second computer at a time that is prior to the determined completion time, and
         output an instruction to cancel connection between the first computer and the plurality of storage devices and an instruction to make connection between the second computer and the plurality of storage devices, to the switch, when the storing is completed,
      the switch is configured to switch the target from the first computer to the second computer when the storing is completed,
      the control device is configured to output an instruction to process the data to the second computer after the connection is made, and
      the second computer is configured to execute processing of the data stored in the plurality of storage devices.

6. The information processing system according to claim 5, wherein power consumption by the second computer is greater than power consumption by the first computer.

7. The information processing system according to claim 5, wherein the control device outputs an instruction to power off the first computer, when the connection between the first computer and the plurality of storage devices is cancelled.

8. The information processing system according to claim 5, wherein the control device is configured to
   obtain an execution time for processing of the storing the data transmitted from the first computer in the plurality of storage devices, by dividing a value, obtained from multiplication of volume of the data by number of storage devices to which the data is written out of the plurality of storage devices, by a data transmission rate through a network that couples the first computer and the second computer, and
   add the execution time to current time.

9. The information processing system according to claim 5, wherein the control device is configured to determine the time at which the second computer is powered on by subtraction of a period from the powering on the second computer to completion of start processing in the second computer from the completion time.

* * * * *